US009045048B2

(12) United States Patent
Yukizane et al.

(10) Patent No.: US 9,045,048 B2
(45) Date of Patent: Jun. 2, 2015

(54) CHARGING CONTROL APPARATUS, CHARGING SYSTEM, AND CHARGING CONTROL METHOD

(75) Inventors: Ryota Yukizane, Fukuoka (JP); Hisao Koga, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 371 days.

(21) Appl. No.: 13/618,541

(22) Filed: Sep. 14, 2012

(65) Prior Publication Data
US 2013/0009599 A1    Jan. 10, 2013

Related U.S. Application Data (63) Continuation-in-part of application No. PCT/JP2011/001639, filed on Mar. 18, 2011.

(30) Foreign Application Priority Data

Mar. 23, 2010 (JP) ................. 2010-066055

(51) Int. Cl.
*H02J 7/00* (2006.01)
*B60L 11/18* (2006.01)
(Continued)

(52) U.S. Cl.
CPC ......... *B60L 11/1816* (2013.01); *B60L 11/1824* (2013.01); *B60L 11/185* (2013.01); *B60L 2200/12* (2013.01); *B60L 2230/16* (2013.01);
(Continued)

(58) Field of Classification Search
CPC ... Y02T 90/14; Y02T 10/7005; Y02T 90/128; Y02T 10/7088; Y02E 60/12; H02J 7/0068
USPC ................. 320/109, 137
See application file for complete search history.

(56) References Cited

U.S. PATENT DOCUMENTS 5,594,318 A    1/1997 Nor
8,294,420 B2 * 10/2012 Kocher ................ 320/109
(Continued)

FOREIGN PATENT DOCUMENTS

JP    11-503599    3/1999
JP    2006-020438    1/2006
(Continued)

OTHER PUBLICATIONS

International Search Report dated Jun. 21, 2011.
(Continued)

*Primary Examiner* — Stacy Whitmore
*Assistant Examiner* — Magid Dimyan
(74) *Attorney, Agent, or Firm* — Seed IP Law Group PLLC (57) ABSTRACT

A charging control apparatus (1) that controls charging of a plurality of vehicles connected via a power line is provided with an electrical storage section (41) that stores power supplied from a power source, a communication section that receives information relating to supply power from the plurality of vehicles, a power amount calculation section (43) that calculates a supply power amount for the plurality of vehicles based on the information, and a control section that, if the supply power amount exceeds a second threshold value combining a remaining charge amount of the electrical storage section (41) and a contractual power amount, controls supply power for the plurality of vehicles so as to become smaller than the second threshold value.

12 Claims, 7 Drawing Sheets

(51) Int. Cl.
*H02J 3/14* (2006.01)
*H02J 13/00* (2006.01)

(52) U.S. Cl.
CPC .......... *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01); *H02J 3/14* (2013.01); *H02J 7/0027* (2013.01); *H02J 13/0024* (2013.01); *H02J 13/0062* (2013.01); *Y02T 90/16* (2013.01); *Y02T 90/168* (2013.01); *Y02T 10/7055* (2013.01); *Y04S 30/12* (2013.01)

(56) References Cited

U.S. PATENT DOCUMENTS

| | | | | |
|---|---|---|---|---|
| 8,401,722 B2* | 3/2013 | Gale et al. | | 701/22 |
| 8,454,377 B2* | 6/2013 | Heichal et al. | | 439/247 |
| 8,710,798 B2* | 4/2014 | Turner | | 320/109 |
| 8,716,978 B2* | 5/2014 | Kim | | 320/109 |
| 8,731,730 B2* | 5/2014 | Watkins et al. | | 700/292 |
| 8,744,641 B2* | 6/2014 | Ito | | 700/295 |
| 8,760,115 B2* | 6/2014 | Kinser et al. | | 320/109 |
| 8,815,424 B2* | 8/2014 | Scheucher | | 429/50 |
| 8,841,881 B2* | 9/2014 | Failing | | 320/109 |
| 8,860,377 B2* | 10/2014 | Scheucher | | 320/162 |
| 8,866,438 B2* | 10/2014 | Lee et al. | | 320/109 |
| 2002/0070705 A1 | 6/2002 | Buchanan | | |
| 2003/0007369 A1* | 1/2003 | Gilbreth et al. | | 363/35 |
| 2004/0130292 A1 | 7/2004 | Buchanan | | |

FOREIGN PATENT DOCUMENTS

| | | |
|---|---|---|
| JP | 3123576 | 6/2006 |
| JP | 2007-252118 | 9/2007 |
| JP | 2007-535282 | 11/2007 |
| JP | 3148265 | 1/2009 |
| JP | 2010-022099 | 1/2010 |

OTHER PUBLICATIONS

Written Opinion of the International Preliminary Examining Authority dated Jun. 21, 2011, with English translation.
Written Reply to the written opinion of the international Preliminary Examining Authority dated Jun. 21, 2011.

* cited by examiner

CHARGING CONTROL APPARATUS, CHARGING SYSTEM, AND CHARGING CONTROL METHOD

CROSS REFERENCE TO RELATED APPLICATIONS

This application is a continuation (in-part) of International Patent Application No. PCT/JP2011/001639, filed on Mar. 18, 2011, the disclosure of which is incorporated herein by reference in its entirety. International Patent Application No. PCT/JP2011/001639 is entitled to (or claims) the benefit of Japanese Patent Application No. 2010-066055, filed on Mar. 23, 2010, the disclosure of which is incorporated herein by reference in its entirety.

TECHNICAL FIELD

The present invention relates to a charging control apparatus, charging system, and charging control method whereby power is supplied to a vehicle that incorporates a storage battery and a motor that rotates the wheels, and drives the motor using power of the storage battery.

RELATED ART

In recent years, attention has continued to been drawn to an electric vehicle that incorporates a storage battery and a motor that rotates the wheels, and drives the motor using power of the storage battery, as an environment-friendly vehicle. With a vehicle of this kind, a storage battery inside the vehicle body is charged with power using an external vehicle charging apparatus or the like. As electric vehicles become widely used, a large number of vehicle charging stands are also expected to be installed in large shopping centers. For example, a large number of vehicle charging stands will be installed at a charging station within a store's parking lot, with each vehicle charging stand being connected to a power source section inside the store. A user will connect his or her vehicle to a feeder cable of a vehicle charging stand, and perform vehicle charging (see Patent Literature 1, for example).

CITATION LIST

Patent Literature

PTL 1
Japanese Utility Model Registration Application Laid-Open No. 3148265

SUMMARY

A user performs vehicle charging at a vehicle charging stand after selecting either fast charging with a short charging time or normal charging with a long charging time.

However, a vehicle charging apparatus uses a larger charging current for fast charging than for normal charging. Therefore, if a large number of users select fast charging, the supply power amount for a vehicle charging apparatus from a power source section inside a store greatly increases. If this results in the supply power amount exceeding an amount of power contracted for with a power company, for example, a breaker inside the power source section will operate and supplying of power will be stopped. There is consequently a problem of power not being supplied from the power source section to a vehicle charging stand of the vehicle charging apparatus, and of power not being able to be supplied to a vehicle from a vehicle charging stand.

For example, there is a demand for a charging control apparatus, charging system, and charging control method that make it possible for charging power to be supplied to each vehicle even when a large number of vehicles using a charging station select fast charging that requires a large charging current.

Thus, a charging control apparatus of an embodiment described below has an electrical storage section that stores power, and controls charging of a plurality of vehicles based on a remaining charge amount of this electrical storage section, a supply power amount for the plurality of vehicles connected via a power line, and a contractual power value. That is to say, the charging control apparatus receives information relating to supply power from the plurality of vehicles, and calculates the supply power amount for the plurality of vehicles based on this information. Then, if the supply power amount exceeds a value combining a remaining charge amount of the electrical storage section and the contractual power amount, a control section of the charging control apparatus performs control so that supply power for the plurality of vehicles becomes smaller than the value.

A charging control apparatus of an embodiment described below that controls charging of a plurality of vehicles connected via a power line, the charging control apparatus has an electrical storage section that stores power supplied from a power source, a communication section that receives information relating to supply power from the plurality of vehicles, a power amount calculation section that calculates a supply power amount for the plurality of vehicles based on the information, and a control section that, if the supply power amount exceeds a second threshold value combining a remaining charge amount of the electrical storage section and a contractual power amount, controls supply power for the plurality of vehicles so as to become smaller than the second threshold value.

Also, a charging system of an embodiment described below that performs charging of a plurality of vehicles, the charging system has a charging control apparatus; and a charging apparatus connected to the charging control apparatus via a power line, wherein the charging control apparatus has an electrical storage section that stores power supplied from a power source, a first communication section that receives information relating to supply power from the charging apparatus and also transmits a control signal to the charging apparatus, a power amount calculation section that calculates a supply power amount for the plurality of vehicles based on the information; and a first control section that, if the supply power amount exceeds a second threshold value combining a remaining charge amount of the electrical storage section and a contractual power amount, generates the control signal that performs control so that supply power for the plurality of vehicles becomes smaller than the second threshold value; and the charging apparatus has a second communication section that receives the control signal transmitted from the charging control apparatus, and a second control section that controls charging of the plurality of vehicles based on the control signal.

Furthermore, a charging control method of an embodiment described below that controls charging of a plurality of vehicles, the charging control method has a step of storing power supplied from a power source, a step of receiving information relating to supply power from the plurality of vehicles, a step of calculating supply power for the plurality of vehicles based on the information; and a step of, if the supply power amount exceeds a second threshold value combining the stored power and a contractual power amount, controlling supply power for the plurality of vehicles so as to become smaller than the second threshold value.

According to a charging control apparatus, charging system, and charging control method described in the above embodiment, when a supply power amount to be supplied to charging apparatuses is large—for example, when the supply power amount is larger than an amount of power contracted for with a power company—power from an electrical storage section is supplied to each charging apparatus in conjunction with power of a power source section, enabling the amount of power to be supplied to be reduced by the amount of power supplied from the electrical storage section. By this means, even when a large number of users having a vehicle connected to a charging apparatus select fast charging that requires a large charging current, a breaker that prevents an overcurrent in the power source section does not operate, and charging power can be supplied to each vehicle from each vehicle charging stand.

DESCRIPTION OF EMBODIMENTS

Now, an embodiment will be described with reference to the accompanying drawings. Identical or equivalent parts in the drawings are assigned the same reference signs.

Embodiment

First, a vehicle charging apparatus (charging control apparatus) according to this embodiment will be described with reference to FIG. 1 through FIG. 5. Here, a case is described by way of example in which an electric vehicle incorporates a storage battery and a motor that rotates the wheels, and drives the motor using power stored in the storage battery. With an electric vehicle, power stored in the storage battery is supplied to the motor and wheels are rotated by the motor, enabling the vehicle to move.

Figure 1:
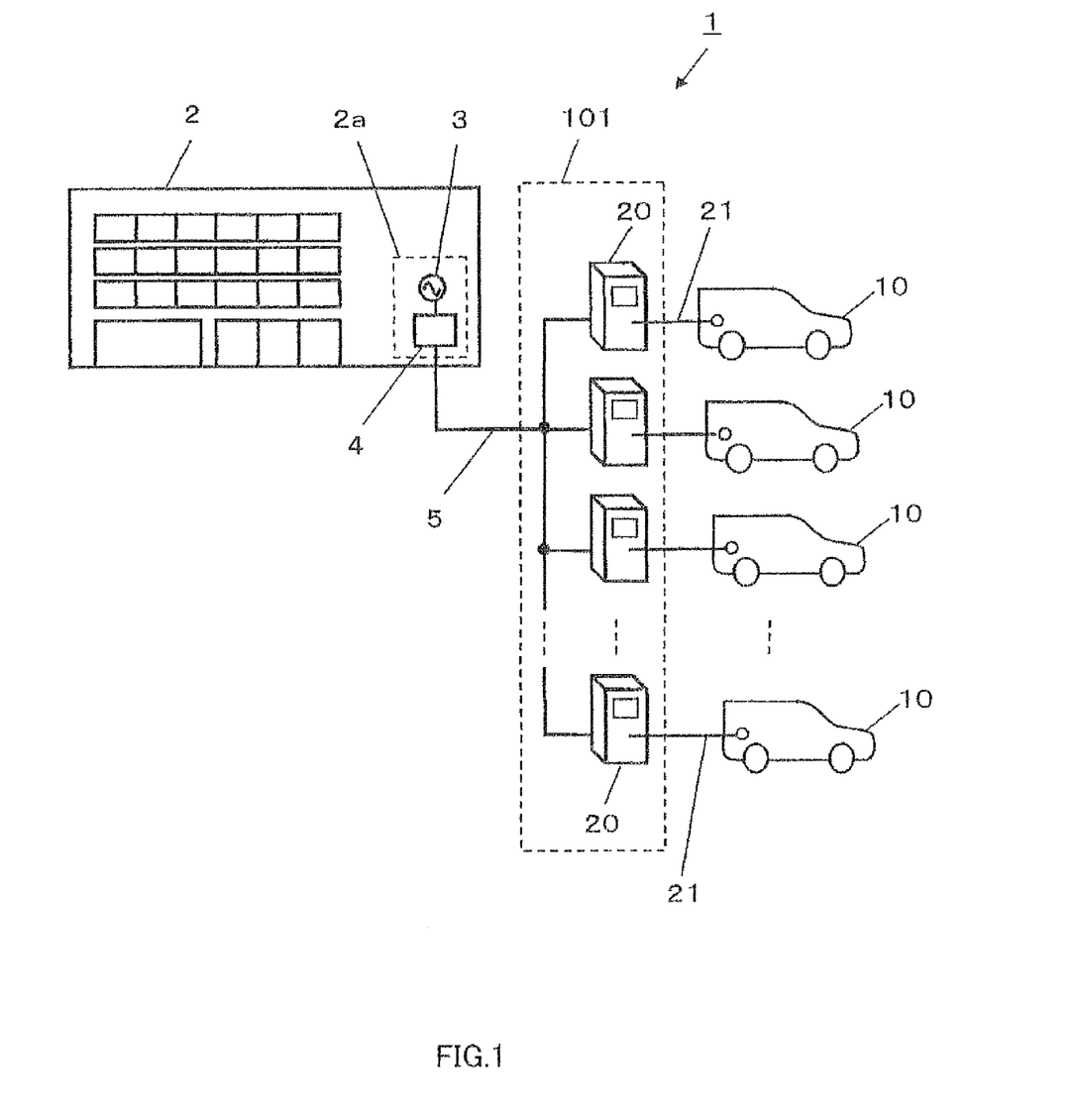
FIG. 1 is a configuration diagram of a vehicle charging apparatus according to an embodiment.

FIG. 1 is a configuration diagram of vehicle charging apparatus 1 according to the embodiment. In FIG. 1, vehicle charging apparatus is provided with power supplying section 4 connected to power source section 3, and a plurality of vehicle charging stands 20 connected to power supplying section 4 via power line 5.

Figure 2:
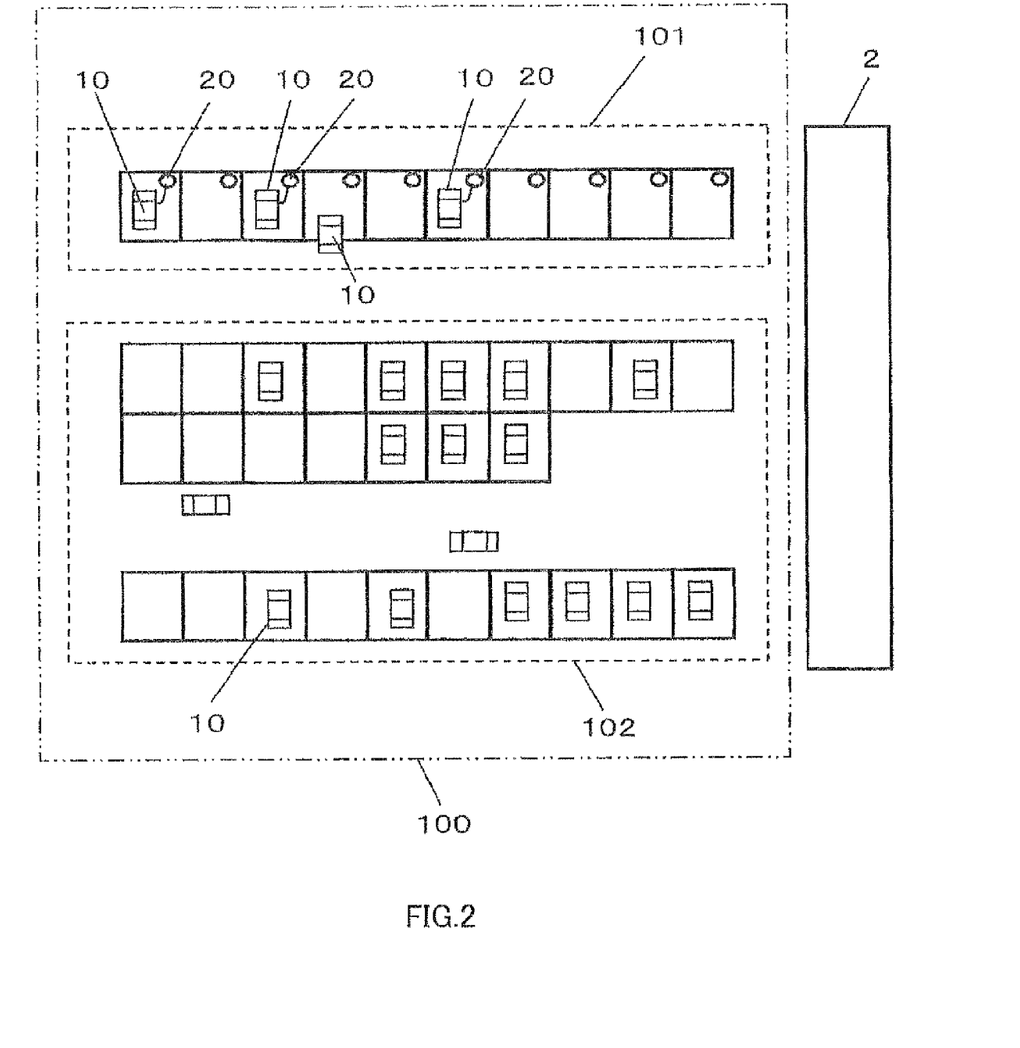
FIG. 2 is a layout drawing showing a sample charging station layout of the vehicle charging apparatus according to the embodiment.

FIG. 2 is a layout drawing showing a sample charging station layout. Within parking lot 100 of large store 2 (a large shopping center, electronics retail store, convenience store, or the like, for example), there are provided dedicated charging area 101 for performing charging of the storage batteries of vehicles 10 such as electric vehicles, and normal parking area 102 in which vehicles 10 not performing charging are parked.

The plurality of vehicle charging stands 20 are provided in dedicated charging area 101, and as shown in FIG. 1, each vehicle charging stand 20 is provided with feeder cable 21 for supplying charging power to vehicle 10. A user connects feeder cable 21 to a feed socket of vehicle 10, and charges a storage battery inside the body of vehicle 10 with charging power.

Power supplying section 4 is located in power source room 2a of store 2, for example, and is connected to power source section 3 inside power source room 2a. A breaker (not shown) for preventing an overcurrent is provided inside power source section 3.

At vehicle charging stand 20, a user selects either fast charging with a short charging time or normal charging with a long charging time, and performs charging of vehicle 10. For example, with fast charging, 80% charging is performed for 15 to 30 minutes in order to fully charge the storage battery of vehicle 10. Consequently, a charger of the order of 30 kW to 60 kW (its current capacity is approximately 150 A at a voltage of 200 V to 400 V) is used in fast charging. On the other hand, with normal charging, 80% charging is performed for 45 to 90 minutes, and a charger of the order of 10 kW to 20 kW (its current capacity is approximately 50 A at a voltage of 200 V to 400 V) is used. Thus, the charging current is kept lower in normal charging than in fast charging.

However, if a large number of users with vehicles 10 connected to vehicle charging stands 20 of a charging station select fast charging, the supply power amount supplied from power source section 3 inside store 2 greatly increases since the charging current for fast charging is larger than for normal charging in vehicle charging apparatus 1. If this results in the supply power amount supplied to vehicle charging apparatus 1 from power source section 3 exceeding an amount of power contracted for with a power company, for example, a breaker inside power source section 3 will operate and power source section 3 will stop supplying power to vehicle charging apparatus 1. Consequently, it may happen that power is not supplied to vehicle charging stands 20 from power source section 3, and thus charging power can no longer be supplied to vehicles 10 from vehicle charging stands 20.

Thus, in this embodiment, a configuration is used that enables charging power to be supplied to vehicles 10 from vehicle charging stands 20 even when a large number of users with vehicles 10 connected to vehicle charging stands 20 of a charging station select fast charging that requires a large charging current.

Figure 3:
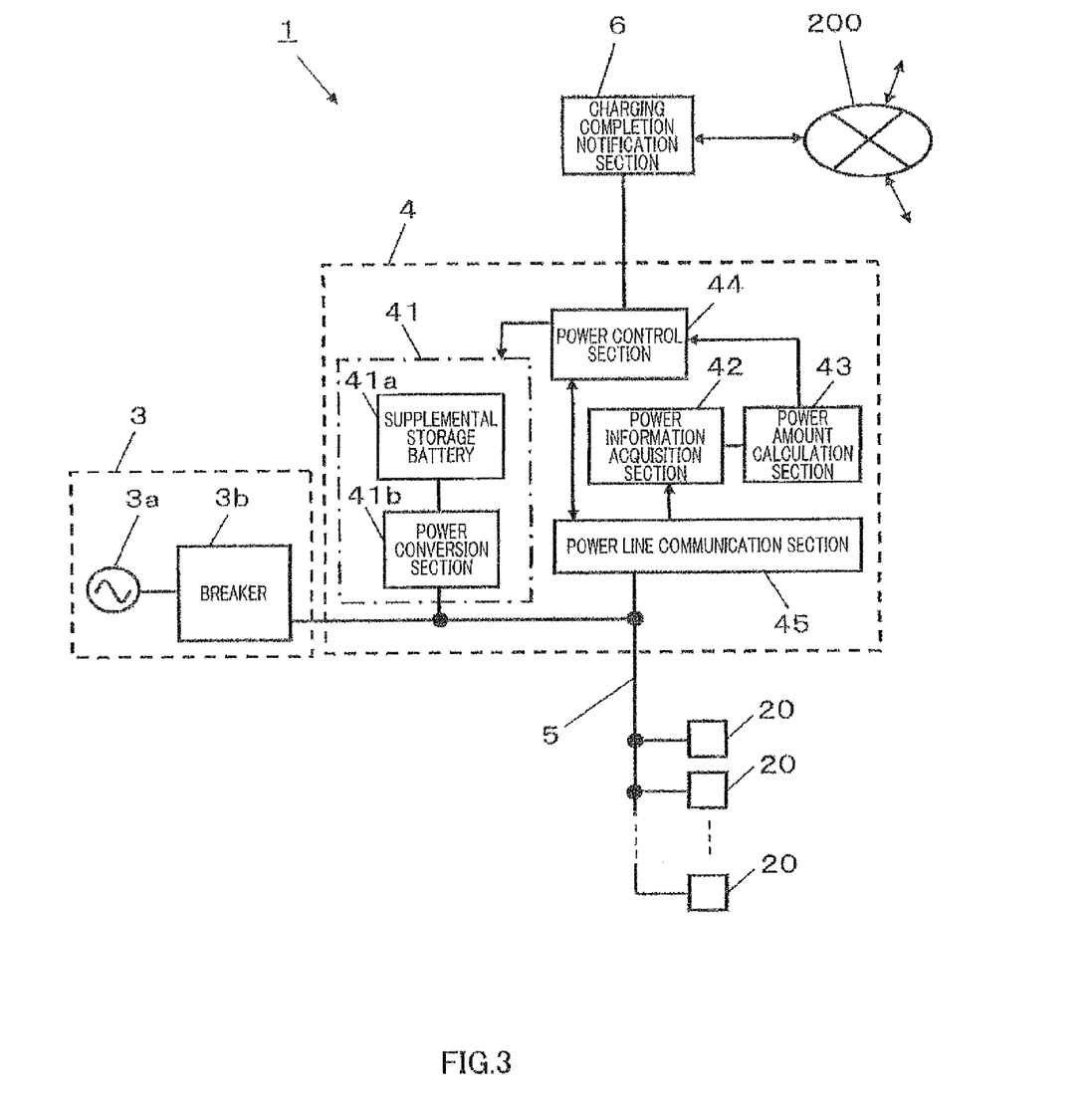
FIG. 3 is a block diagram of the vehicle charging apparatus according to the embodiment.

That is to say, the configuration of vehicle charging apparatus 1 shown in FIG. 3 is used. FIG. 3 is a block diagram of vehicle charging apparatus 1.

As shown in FIG. 3, power supplying section 4 of vehicle charging apparatus 1 has supplemental electrical storage section 41 connected to power line 5, power information acquisition section 42, power amount calculation section 43, and power control section 44.

Power information acquisition section 42 acquires charging information of each vehicle charging stand 20 connected to power line 5 via power line communication section 45. Also, each vehicle charging stand 20 acquires charging information from vehicle 10 using power line communication. Based on charging information of each vehicle charging stand 20 acquired by power information acquisition section 42, power amount calculation section 43 calculates a supply power amount to be supplied to each vehicle charging stand 20 via power line 5. Power control section 44 controls supplemental electrical storage section 41 based on a supply power amount calculated by power amount calculation section 43. Specifically, if a supply power amount calculated by power amount calculation section 43 is greater than a first threshold value, power control section 44 performs control so that supplemental power from supplemental electrical storage section 41 is supplied to each vehicle charging stand 20 in conjunction with power from power source section 3.

By means of this configuration, when a supply power amount to be supplied to vehicle charging stands 20 exceeds the first threshold value—for example, when the supply power amount is greater than the maximum supply power amount contracted for with a power company—vehicle charging apparatus 1 supplies supplemental power from supplemental electrical storage section 41 inside power supplying section 4 to vehicle charging stands 20 in conjunction with power from power source section 3. Therefore, with respect to an amount of power to be supplied, the amount of power supplied from commercial power source 3a of power source section 3 can be reduced by the amount of supplemental power. By this means, even when a large number of users of vehicles 10 in dedicated charging area 101 select fast charging that requires a large charging current, breaker 3b that prevents an overcurrent in power source section 3 does not operate, and charging power can be supplied to each vehicle 10 from each vehicle charging stand 20. That is to say, vehicle charging apparatus 1 can supply power to be supplied to each vehicle charging stand 20 via power line 5 using power from power source section 3 and supplemental power from supplemental electrical storage section 41 in conjunction with each other, enabling vehicle charging stands 20 to supply vehicles 10 with the necessary charging power.

Also, since a power company increases its fees in a stepwise manner according to the size of an amount of power supplied from commercial power source 3a, if a supply power amount is calculated on the assumption of fast charging that requires a large charging current for all vehicles 10, and a contract is so concluded with the power company, the power amount fee becomes high. Consequently, by lowering the peak value of the supply power amount from commercial power source 3a, the contracted usage fee can be set at a low amount, and economization can be achieved.

Apart from a method whereby a supply power amount is calculated by power amount calculation section 43, the number of vehicle charging stands 20 supplying power to supplying power to vehicles 10 may be counted, and the difference from the first threshold value (contractual power) may be determined using the number of vehicle charging stands 20 operating. At this time, the count of vehicle charging stands 20 is executed by power control section 44 based on information acquired by power information acquisition section 42.

Supplemental electrical storage section 41 is provided with supplemental storage battery 41a and power conversion section 41b. When charged with power from commercial power source 3a, supplemental electrical storage section 41 causes power conversion section 41b to convert alternating current power of commercial power source 3a to direct current power, and outputs this direct current power to supplemental storage battery 41a. On the other hand, when supplying supplemental power from supplemental storage battery 41a to power line 5, supplemental electrical storage section 41 causes power conversion section 41b to convert direct current power of supplemental storage battery 41a to alternating current power, and supplies supplemental power from supplemental storage battery 41a to power line 5.

If a supply power amount calculated by power amount calculation section 43 is less than or equal to the first threshold value, power control section 44 performs control so as to stop the supply of supplemental power from supplemental electrical storage section 41, and charge supplemental electrical storage section 41 with power from power source section 3. Supplemental electrical storage section 41 is charged with cheap-rate late-night power, thereby enabling users to be provided with supplemental power inexpensively.

Also, if a supply power amount calculated by power amount calculation section 43 is larger than the first threshold value, and less than or equal to a second threshold value (for example, an amount of power combining the maximum supply power amount contracted for with a power company and supplemental power from supplemental electrical storage section 41), power control section 44 performs control so as to supply supplemental power from supplemental electrical storage section 41 to vehicle charging stands 20 in conjunction with power from power source section 3. By this means, power can be supplied from vehicle charging stands 20 to vehicles 10, and charge vehicles 10, without extending the charging time—that is, without reducing the charging power. Being able to predict the charging time is useful for a user in a hurry.

Furthermore, if a supply power amount calculated by power amount calculation section 43 is larger than the first threshold value, and larger than the second threshold value, power control section 44 transmits a power reduction control signal to each vehicle charging stand 20, and reduces the charging power. When the charging power is reduced the charging time becomes longer. However, there are few such cases. That is to say, a reduction in the charging power occurs when a charging station is crowded and there is a concentration of using of fast charging. Consequently, in effect, charging of vehicles 10 from vehicle charging apparatus 1 is performed without the charging time being very greatly extended.

In the above example, a supply power amount is used as a criterion for controlling the operation of supplemental electrical storage section 41, but in this embodiment, apart from a supply power amount, the number of vehicle charging stands 20 supplying power to vehicles 10 may also be used as a criterion.

As a first power reduction method, each vehicle charging stand 20 supplies or stops charging power to each vehicle 10 on a time division basis in accordance with a directive of a control signal from power control section 44.

Alternatively, as a second power reduction method, each vehicle charging stand 20 lowers a charging current to each vehicle 10 depending on a uniform reduction ratio, or reduction ratios based on a predetermined distribution ratio, in accordance with a directive of control signal from a power control section 44.

Also, charging completion notification section 6 is connected to power control section 44, and charging completion notification section 6 is connected to external network 200.

Charging completion notification section 6 notifies a user of charging completion information for vehicle 10 connected to vehicle charging stand 20, by means of a notification from power control section 44. Charging completion notification section 6 also adds billing information in accordance with the connection time to charging completion information and transmits this information. For example, a message such as the following is sent to a mobile phone or the like via network 200: "Charging has been completed. Please move your vehicle to normal parking area 102 within xx minutes. A fee of ¥100 per 15 minutes will be billed from now on." By this means, vehicles 10 can be quickly cleared from dedicated charging area 101, enabling congestion within the charging station to be minimized, and utilization efficiency to be improved.

Charging completion notification section 6 also adds billing information in accordance with the connection time between vehicle charging stand 20 and vehicle 10 to charging completion information and gives notification of this information. By this means, also, a user can be encouraged to clear vehicle 10 from dedicated charging area 101 quickly, enabling congestion within the charging station to be minimized, and utilization efficiency to be improved.

Power supplying section 4 is provided with power line communication section 45 that communicates using power line 5. Power information acquisition section 42 or power control section 44 communicates with vehicle charging stand 20 via power line communication section 45. By this means, power information acquisition section 42 and power control section 44 can communicate with vehicle charging stand 20 via power line 5, eliminating the need for installation of an additional communication section due to an increase in vehicle charging stands 20, and so enabling system expansion to be implemented easily.

Figure 4:
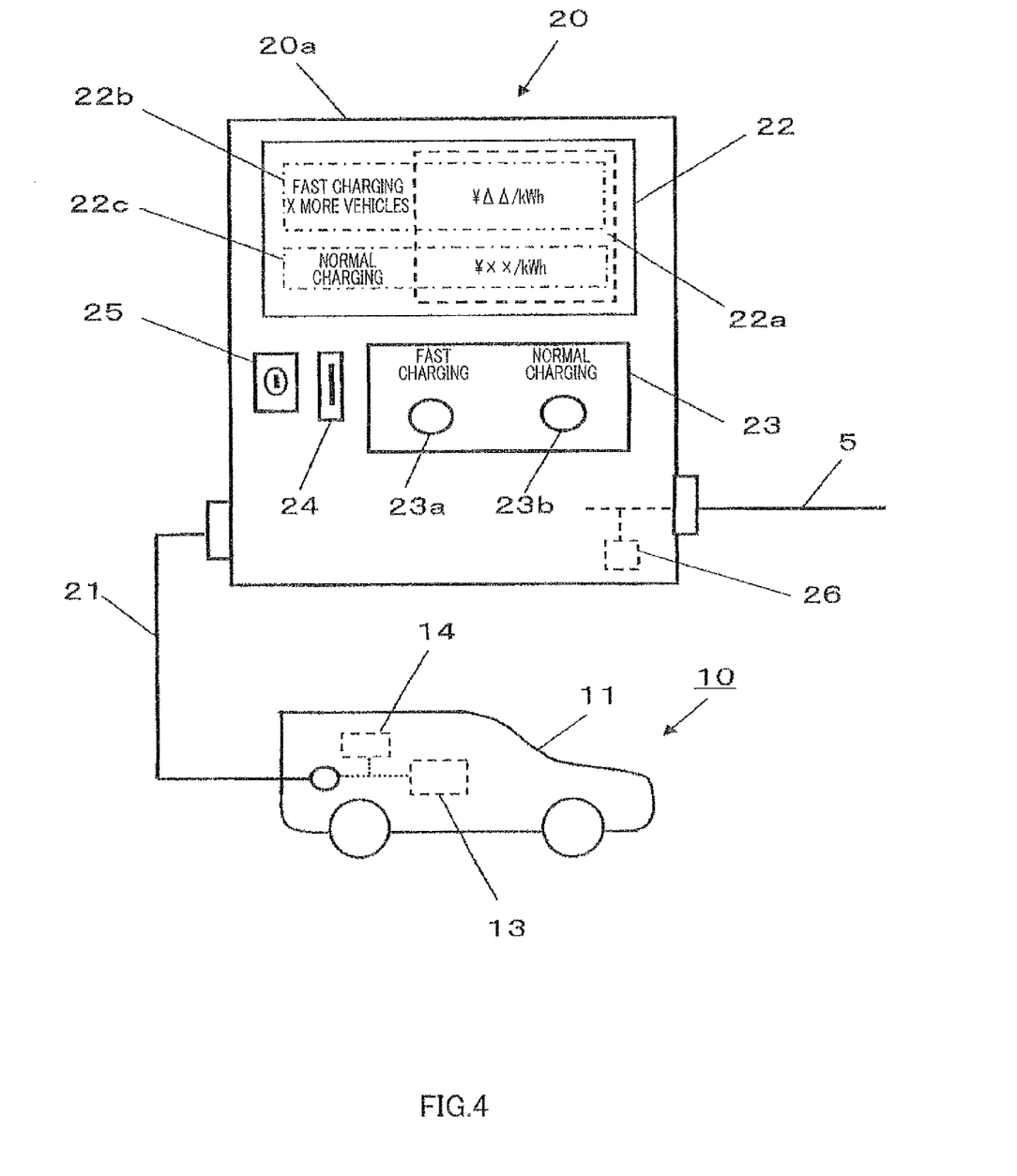
FIG. 4 is a configuration diagram explaining the configuration of a vehicle charging stand of the vehicle charging apparatus according to the embodiment.
Figure 5:
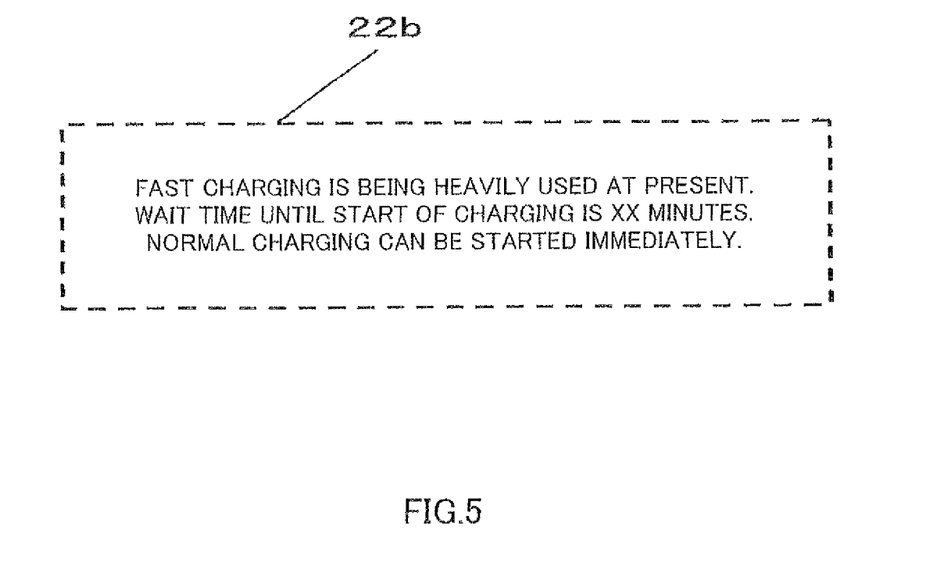
FIG. 5 is a drawing explaining a sample display of a display section of the vehicle charging stand of the vehicle charging apparatus according to the embodiment.

Next, vehicle charging stand 20 will be described with reference to FIG. 4 and FIG. 5. FIG. 4 is a configuration diagram explaining the configuration of vehicle charging stand 20 of vehicle charging apparatus 1, and FIG. 5 is a drawing explaining a sample display of display section 22 of vehicle charging stand 20.

As shown in FIG. 4, vehicle charging stand 20 is provided with display section 22, setting input section 23, card reading section 24, cash payment section 25, and power line communication section 26, in housing 20a.

Power line communication section 26 receives a control signal relating to charging transmitted from power line communication section 45 of vehicle charging apparatus 1. Furthermore, vehicle charging stand 20 is provided with a charging control section (not shown). The charging control section controls charging of vehicle 10 based on a control signal transmitted from vehicle charging apparatus 1. Specifically, if a supply power amount supplied by vehicle charging apparatus 1 becomes larger than the second threshold value (for example, an amount of power combining the maximum supply power amount contracted for with a power company and supplemental power from supplemental electrical storage section 41), vehicle charging apparatus 1 transmits a control signal for reducing the charging power for each vehicle 10 to each vehicle charging stand 20. The charging control section of each vehicle charging stand 20 performs control to reduce the charging power for each vehicle 10 based on that control signal. On the other hand, if a supply power amount supplied by vehicle charging apparatus 1 becomes smaller than the second threshold value, vehicle charging apparatus 1 transmits a control signal for increasing the charging power for each vehicle 10 to each vehicle charging stand 20. The charging control section of each vehicle charging stand 20 performs control to increase the charging power for each vehicle 10 based on that control signal. Vehicle charging stand 20 is also provided with feeder cable 21 that supplies power to vehicle 10. A user connects vehicle 10 to feeder cable 21, and supplies charging power to vehicle 10 from vehicle charging stand 20. In this way, a user charges storage battery 13 inside vehicle body 11 with charging power. Also, power line communication section 14 is provided inside vehicle body 11, and power line communication section 14 is connected to a power line that supplies charging power. Power line communication section 14 notifies vehicle charging stand 20 of battery information on storage battery 13 (storage ratio and remaining charge amount information, or the like) via a power line such as feeder cable 21.

Display section 22 displays charging information to a user. Fee information is displayed in information display area 22a, information relating to fast charging in information display area 22b, and information relating to normal charging or the like in information display area 22c. For example, information display area 22a displays fast charging fee information of ¥ΔΔ for 1 kWh (for example, ¥100 for 1 kWh), and normal charging fee information of ¥xx for 1 kWh (for example, ¥85 for 1 kWh) that is approximately 15% cheaper than the fast charging usage fee. Displaying a fast-charging charging fee higher than a normal-charging charging fee in information display area 22b of display section 22 encourages selection of normal charging by utilizing consumer psychology whereby a person not in a hurry tends to choose a lower fee, and can promote the use of normal charging that requires a smaller charging current than fast charging. By this means, users' selection of fast charging can be suppressed.

In addition, the message "X more vehicles can use fast charging" is displayed in information display area 22b of display section 22. This enables a user to readily ascertain the usage situation of the charging station. The number of vehicles that can use fast charging is set lower than the maximum number of vehicles that can use the facility (for example, being set as the average number of vehicles using the facility per predetermined time period, such as an hour), and is so displayed. By this means, even if all the users of vehicles 10 in the charging station select fast charging, a margin of power can be provided with respect to the number of vehicles to which power can be supplied, so that the number of times of using supplemental power decreases. By this means, time for charging supplemental electrical storage section 41 with power from power source section 3 can be secured.

Similarly, as shown in FIG. 5, the following message is displayed in information display area 22b of display section 22 together with fee information: "Fast charging is being heavily used at present. Wait time until start of charging is xx minutes. Normal charging can be started immediately." This, too, encourages selection of normal charging by utilizing consumer psychology—namely, the dislike of waiting—and enables the concentration of users on fast charging to be reduced.

Returning to FIG. 4, setting input section 23 is provided with fast charging button 23a and normal charging button 23b. When a user presses fast charging button 23a at vehicle charging stand 20, fast charging mode is entered, and when a user presses normal charging button 23b, normal charging mode is entered. Information regarding these charging modes is used when calculating a charging power amount of vehicle charging stand 20.

Card reading section 24 is used to pay a usage fee with a store-issued point card or a credit card when charging is completed.

Cash payment section 25 is for paying a usage fee with cash (coins or bills) when charging is completed.

Also, power line communication section 26 performs power line communication with power supplying section 4 (for example, power line communication section 45 inside power supplying section 4) using power line 5. Power line communication section 26 transmits charging mode information set and input by setting input section 23, charging power amount information in accordance with the charging mode, charging completion information, and so forth, to power supplying section 4 via power line 5. Also, power line communication section 26 communicates with power line communication section 14 of vehicle 10 via feeder cable 21, acquires battery information on storage battery 13, and transfers the battery information on storage battery 13 to power supplying section 4. By this means, power supplying section 4 can efficiently perform power management (charging power scheduling management and charging power control for each vehicle 10) by ascertaining in detail the charging situation of each vehicle 10, notification of usage information (waiting time notification and charging completion notification) to users, changes in display contents of display section 22, and so forth.

Figure 6:
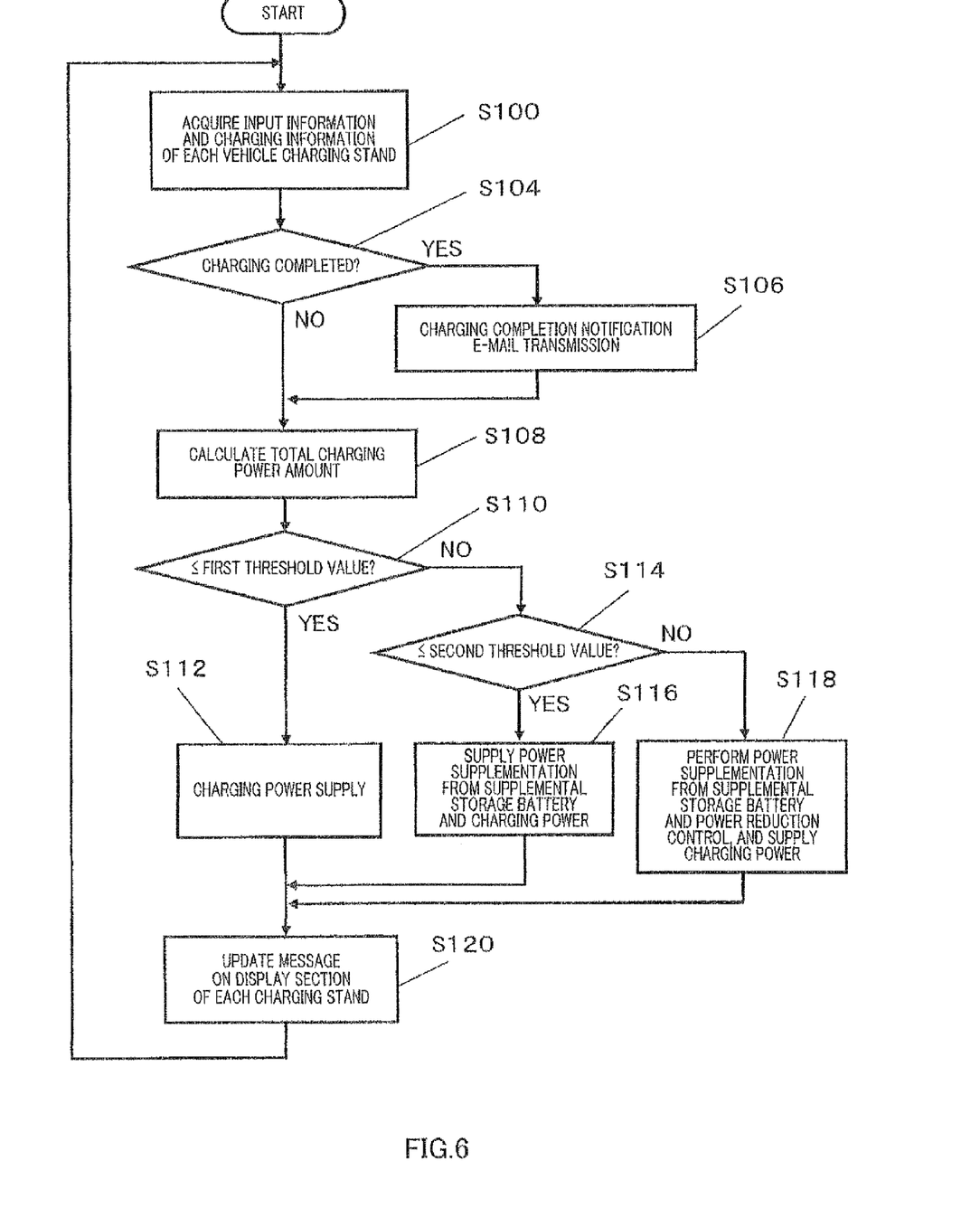
FIG. 6 is a flowchart explaining the operation of the vehicle charging apparatus according to the embodiment.

Next, the operation of vehicle charging apparatus 1 will be described with reference to FIG. 1, FIG. 3, FIG. 4, and FIG. 6. FIG. 6 is a flowchart explaining the operation of vehicle charging apparatus 1.

First, in vehicle charging apparatus 1, feeder cable 21 of each vehicle charging stand 20 is inserted into the feed socket of each vehicle 10, and charging power is supplied to each vehicle 10 from each vehicle charging stand 20.

Vehicle charging apparatus 1 acquires charging mode selection information and charging completion information of each vehicle 10 from each vehicle charging stand 20 (S100).

If there is a vehicle 10 for which charging has been completed, vehicle charging apparatus 1 sends a charging completion notification e-mail to a mobile phone or the like by means of charging completion notification section 6 via network 200 (S104, S106).

On the other hand, if there is no vehicle 10 for which charging has been completed at any vehicle charging stand 20, vehicle charging apparatus 1 calculates the total amount of supply power amounts supplied to each vehicle charging stand 20. In this supply power amount calculation, charging mode information of each vehicle charging stand 20 is used, and the number of stands performing fast charging and the number of stands performing normal charging are multiplied by respective charging currents (S108).

If the supply power amount calculated by power amount calculation section 43 is less than or equal to the first threshold value, vehicle charging apparatus 1 uses power control section 44 to stop the supply of supplemental power from supplemental electrical storage section 41 and charge supplemental electrical storage section 41 with power from power source section 3 (S110, S112).

Also, if the supply power amount calculated by power amount calculation section 43 is larger than the first threshold value and smaller than a second threshold value, vehicle charging apparatus 1 supplies supplemental power from supplemental electrical storage section 41 to each vehicle charging stand 20 in conjunction with power from power source section 3 (S110, S114, S116). By this means, each vehicle charging stand 20 supplies charging power to each vehicle 10.

Furthermore, if the supply power amount calculated by power amount calculation section 43 is larger than or equal to the second threshold value larger than the first threshold value, power control section 44 transmits a power reduction control signal to each vehicle charging stand 20, and each vehicle charging stand 20 reduces the charging power to each vehicle 10 according to the transmitted control signal (S110, S114, S118). In this case, for example, each vehicle charging stand 20 supplies or stops charging power to vehicle 10 on a time division basis in accordance with a directive of a control signal from power control section 44. Alternatively, each vehicle charging stand 20 lowers a charging current to vehicle 10 depending on a uniform reduction ratio or reduction ratios based on a predetermined distribution ratio, in accordance with a directive of a control signal from power control section 44.

Next, vehicle charging apparatus 1 updates a message on display section 22 of each vehicle charging stand 20 according to the charging status (S120).

Subsequently, vehicle charging apparatus 1 repeatedly executes (S100) through (S120), and supplies charging power to vehicles 10 from vehicle charging stands 20. By repeatedly executing (S100) through (S120), vehicle charging apparatus 1 can acquire charging information for each vehicle charging stand 20 at a predetermined interval. Supplemental power control, supplied power control, and charging current control can be performed based on charging information.

As described above, vehicle charging apparatus 1 according to this embodiment is provided with power supplying section 4 connected to power source section 3 and a plurality of vehicle charging stands 20 connected to this power supplying section 4 via power line 5, as shown in FIG. 1 and FIG. 3, and supplies charging power to each vehicle 10 connected to each vehicle charging stand 20. Power supplying section 4 acquires charging power information of each vehicle charging stand 20, and calculates a supply power amount to be supplied to each vehicle charging stand 20 based on the charging power information of each vehicle charging stand 20. Then, if the supply power amount is greater than or equal to the first threshold value, power supplying section 4 performs control so as to supply supplemental power from supplemental electrical storage section 41 to each vehicle charging stand 20 in conjunction with power from power source section 3.

By means of this configuration, when a supply power amount to be supplied to vehicle charging stands 20 is larger than the first threshold value—for example, when the supply power amount is larger than an amount of power contracted for with a power company—vehicle charging apparatus 1 supplies supplemental power from supplemental electrical storage section 41 inside power supplying section 4 to each vehicle charging stand 20 in conjunction with power from power source section 3, so that, with respect to an amount of power to be supplied, the amount of power supplied from power source section 3 can be reduced by the amount of supplemental power. By this means, even when a large number of users having vehicle 10 connected to vehicle charging stand 20 within dedicated charging area 101 select fast charging that requires a large charging current, breaker 3b that prevents an overcurrent inside power source section 3 does not operate, and charging power can be supplied to each vehicle 10 from each vehicle charging stand 20.

Vehicle charging apparatus 1 has been assumed to display fee information on display section 22 in FIG. 4, but this is not a limitation. For example, provision may also be made to display on display section 22 of vehicle charging stand 20 an eco mode having an A mode (fast charging) that confirms the charging time and a B mode (normal charging) that reduces the fee when the time becomes long, and to have a user select the A mode or B mode by means of setting input section 23. In this case, fast charging button 23a corresponds to the A mode, and normal charging button 23b corresponds to the B mode.

Also, in this embodiment, electric vehicles have been described as an example, but this is not a limitation. For example, the present invention can also be applied to a vehicle that is charged with charging power such as a hybrid vehicle using both a motor and an engine, an electric motorcycle, an electric bicycle, or the like.

Figure 7:
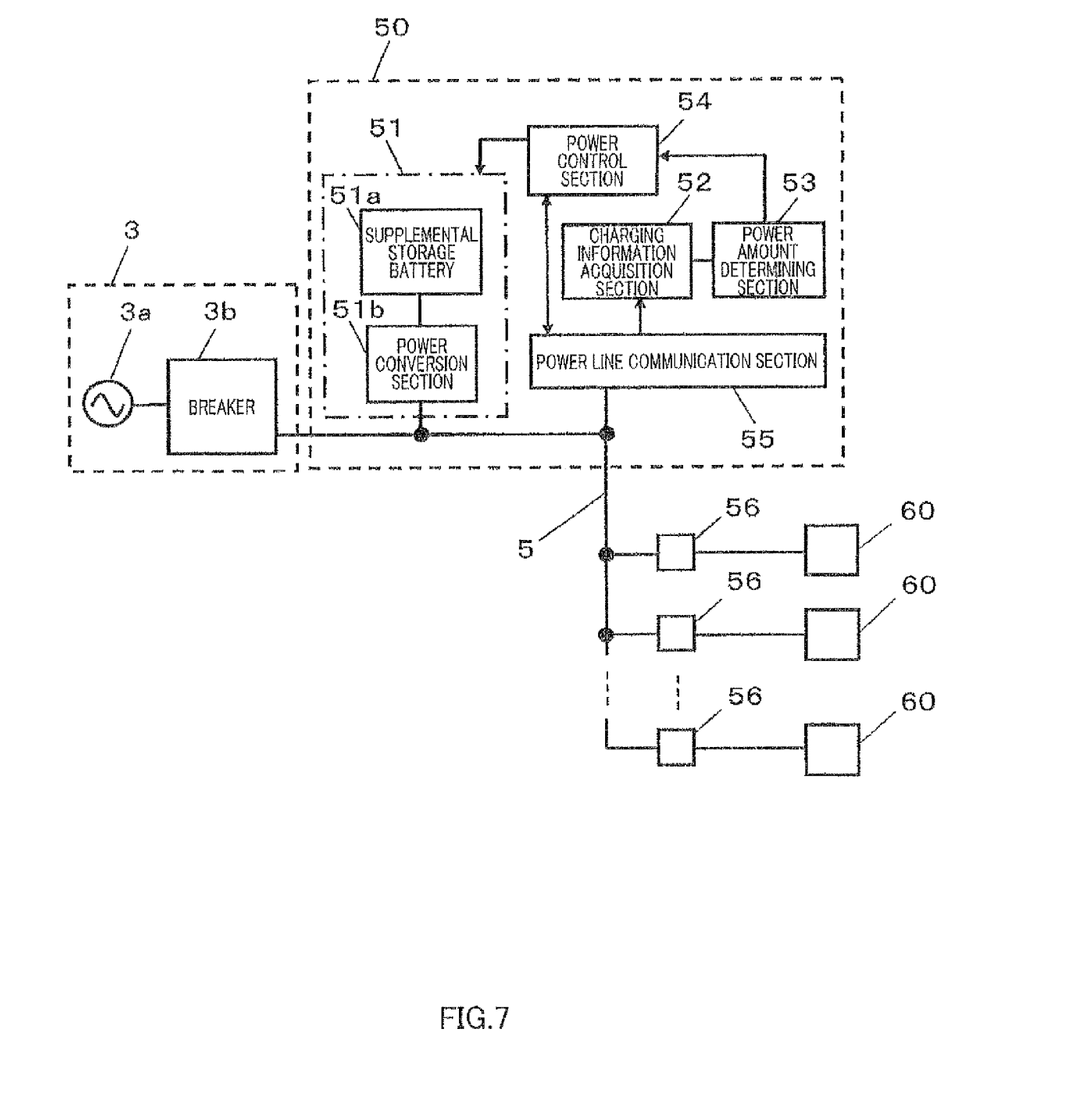
FIG. 7 is a configuration diagram of a power supplying apparatus according to an embodiment.

Also, as shown in FIG. 7, the present invention can also be applied to charging of electrical equipment 60. FIG. 7 is a configuration diagram of power supplying apparatus 50 according to an embodiment.

Power supplying apparatus 50 is connected to power source section 3, and supplies power from power source section 3 to a plurality of charging stands 56 via power line 5. Power supplying apparatus 50 is provided with supplemental electrical storage section 51 connected to power line 5, charging information acquisition section 52, power amount determining section 53, and power control section 54.

Supplemental electrical storage section 51 is provided with supplemental storage battery 51a and power conversion section 51b. When charging with power from commercial power source 3a, supplemental electrical storage section 51 causes power conversion section 51b to convert alternating current power of commercial power source 3a to direct current power, and outputs this direct current power to supplemental storage battery 51a. On the other hand, when supplying supplemental power from supplemental storage battery 51a to power line 5, supplemental electrical storage section 51 causes power conversion section 51b convert direct current power of supplemental storage battery 51a to alternating current power, and supplies supplemental power from supplemental storage battery 51a to power line 5.

Charging information acquisition section 52 acquires charging information of each charging stand 56 connected to power line 5 via power line communication section 55. Power amount determining section 53 determines an amount of power to be supplied to each charging stand 56 based on charging information acquired by charging information acquisition section 52. Power control section 54 supplies supplemental power to be supplied from supplemental electrical storage section 51 to each charging stand 56 in conjunction with power from power source section 3 based on an amount of power determined by power amount determining section 53. Also, each charging stand 56 acquires charging information from electrical equipment 60 using power line communication.

Electrical equipment 60 is chargeable equipment such as a home electrical appliance (for example, a mobile phone, portable music player, or the like), or an electric vehicle battery, for example.

By means of this configuration, when electrical equipment 60 is charged, power supplying apparatus 50 can supply supplemental power from supplemental electrical storage section 51 to charging stand 56 if power from power source section 3 power is insufficient. By this means, for example, each electrical equipment 60 can be charged using power from supplemental electrical storage section 51 even when power from power source section 3 cannot be obtained due to a power outage or the like. This is also useful, for example, when power source section 3 uses a power source subject to fluctuation such as a solar battery, wind power generation, or the like.

A charging control apparatus described in the above embodiment is connected to a power line and performs charging of a plurality of vehicles via a plurality of charging apparatuses, and employs a configuration having: an electrical storage section that stores power supplied from the power line; a communication section that receives information relating to supply power from the plurality of charging apparatuses; and a control section that performs control so that power stored in the electrical storage section is supplied to at least one of the plurality of charging apparatuses, based on the information relating to supply power.

Also, a charging system described in the above embodiment performs charging of a plurality of vehicles, and employs a configuration having a charging control apparatus and a plurality of charging apparatuses, in which the charging control apparatus has: an electrical storage section that stores power supplied from a power line; a first communication section that receives information relating to supply power from the plurality of charging apparatuses; and a first control section that performs control so that power stored in the electrical storage section is supplied to at least one of the plurality of charging apparatuses, based on the information relating to supply power; and the plurality of charging apparatuses have: a second communication section that receives a control signal transmitted from the charging control apparatus; and a second control section that controls charging of the plurality of vehicles based on the control signal.

Furthermore, a charging control method described in the above embodiment performs charging of a plurality of vehicles via a plurality of charging apparatuses through connection to a power line, and has: a step of storing power supplied from the power line; a step of receiving information relating to supply power from the plurality of charging apparatuses; and a step of performing control so that power stored in the electrical storage section is supplied to at least one of the plurality of charging apparatuses, based on the information relating to supply power.

According to a charging control apparatus, charging system, and charging control method described in the above embodiment, when a supply power amount to be supplied to charging apparatuses is large—for example, when the supply power amount is larger than an amount of power contracted for with a power company—power from an electrical storage section is supplied to the charging apparatuses in conjunction with power of a power source section, enabling the amount of power to be supplied to be reduced by the amount of power supplied from the electrical storage section. By this means, even when a large number of users having a vehicle connected to a charging apparatus select fast charging that requires a large charging current, a breaker that prevents an overcurrent in the power source section does not operate, and charging power can be supplied to each vehicle from each vehicle charging stand.

The present invention is not limited to the above-described embodiment, and various variations and modifications may be possible without departing from the scope of the present invention.

INDUSTRIAL APPLICABILITY

According to a vehicle charging apparatus described in the above embodiment, when a supply power amount to be supplied to vehicle charging stands is larger than a first threshold value—for example, when the supply power amount is larger than an amount of power contracted for with a power company—supplemental power from a supplemental electrical storage section inside a power supplying section is supplied to the vehicle charging stands in conjunction with power of a power source section, enabling the amount of power supplied from the power source section to be reduced by the amount of supplemental power. By this means, even when a large number of users in a charging station select fast charging that requires a large charging current, a breaker that prevents an overcurrent in the power source section does not operate, and charging power can be supplied to each vehicle from each vehicle charging stand.

Thus, the present invention is suitable for use in a vehicle charging apparatus or power supplying apparatus that supplies charging power to a vehicle such as an electric car, hybrid car, electric motorcycle, or electric bicycle in which a storage battery is charged with power, and the vehicle runs by rotating the wheels using charged power, or to electrical equipment.

REFERENCE SIGNS LIST

1 Vehicle charging apparatus
2 Store
2a Power source room
3 Power source section
3a Commercial power source
3b Breaker
4 Power supplying section
5 Power line
6 Charging completion notification section
10 Vehicle
11 Vehicle body
13 Storage battery
14, 26, 45, 55 Power line communication section
20 Vehicle charging stand
20a Housing
21 Feeder cable
22 Display section
22a, 22b, 22c Information display area
23 Setting input section
23a Fast charging button
23b Normal charging button
24 Card reading section
25 Cash payment section
41, 51 Supplemental electrical storage section
41a, 51a Supplemental storage battery
41b, 51b Power conversion section
42 Power information acquisition section
43 Power amount calculation section
44, 54 Power control section
50 Power supplying apparatus
52 Charging information acquisition section
53 Power amount determining section
56 Charging stand
60 Electrical equipment
100 Parking lot
101 Dedicated charging area
102 Normal parking area
200 Network

The invention claimed is:

1. A charging control apparatus that controls charging of a plurality of vehicles using a power source, the charging control apparatus comprising:
an electrical storage that stores supplemental power;
a communicator that receives information relating to requested power demanded from the plurality of vehicles;
a power amount calculator that calculates a total requested power amount for the plurality of vehicles based on the received information; and
a controller that controls supply of power to the plurality of vehicles,
wherein when the total requested power amount is larger than a second threshold value which corresponds to a sum of a maximum power amount of the power source and the supplemental power of the electrical storage, the controller sets a supply amount of power supplied from the power source and the electrical storage to the plurality of vehicles to be equal to or smaller than the second threshold value.

2. The charging control apparatus according to claim 1, wherein the controller, when the total requested power amount is larger than a first threshold value which corresponds to the maximum power amount of the power source, performs control so that the supplemental power of the electrical storage is supplied to at least one of the plurality of vehicles.

3. The charging control apparatus according to claim 2, wherein the controller performs control so that power from the power source is stored in the electrical storage when the total requested power amount is smaller than the first threshold value.

4. The charging control apparatus according to claim 1, wherein the controller, when the communicator receives a notification of charging completion sends billing information based on connection time duration between the vehicle(s) and the charging control apparatus.

5. The charging control apparatus according to claim 1, wherein:
the information further includes one or both of information on a first charging mode and information on a second charging mode in which faster charging is performed than in the first charging mode; and
the controller sets a maximum number of vehicles which can be simultaneously charged in the second charging mode.

6. The charging control apparatus according to claim 5, wherein the controller sets the maximum number to be smaller than a maximum number of vehicles which can be simultaneously charged with the charging control apparatus.

7. The charging control apparatus according to claim 6, wherein the controller sends a notification of when the second charging mode can be started.

8. The charging control apparatus according to claim 1, wherein when the total requested power amount is equal to or less than a first threshold value which corresponds to the maximum power amount of the power source, the controller supplies power to the plurality of vehicles only from the power source and not from the electrical storage.

9. The charging control apparatus according to claim 1, wherein when the total requested power amount is larger than a first threshold value which corresponds to the maximum power amount of the power source and is equal to or less than the second threshold value, the controller supplies power to the plurality of vehicles from the power source and the electrical storage.

10. A charging system that performs charging of a plurality of vehicles using a power source, the charging system comprising:
a charging control apparatus; and
a charging apparatus connected to the charging control apparatus via a power line, wherein:
the charging control apparatus includes:
an electrical storage that stores supplemental power;
a first communicator that receives information relating to requested power demanded by the plurality of vehicles from the charging apparatus and also transmits a control signal to the charging apparatus;
a power amount calculator that calculates a total requested power amount for the plurality of vehicles based on the received information; and
a first controller that generates the control signal to control supply of power to the plurality of vehicles; and
the charging apparatus includes:
a second communicator that receives the control signal transmitted from the charging control apparatus; and a second controller that controls charging of the plurality of vehicles based on the control signal;

wherein when the total requested power amount is larger than a second threshold value which corresponds to a sum of a maximum power amount of the power source and the supplemental power of the electrical storage, the controller sets a supply amount of power supplied from the power source and the electrical storage to the plurality of vehicles to be equal to or smaller than the second threshold value.

11. A charging control method that controls charging of a plurality of vehicles using a power source, the charging control method comprising:

storing supplemental power in an electrical storage;

receiving information relating to requested power demanded from the plurality of vehicles;

calculating a total requested power amount for the plurality of vehicles based on the received information; and setting a supply amount of power supplied from the power source and the electrical storage to the plurality of vehicles to be equal to or smaller than the second threshold value, when the total requested power amount is larger than a second threshold value which corresponds to a sum of a maximum power amount of the power source and the supplemental power of the electrical storage.

12. A charging control apparatus that controls charging of a plurality of vehicles from a power source, the charging control apparatus comprising:

an electrical storage that stores supplemental power;

a communicator that receives information relating to requested power demanded from the plurality of vehicles;

a power amount calculator that calculates a total requested power amount for the plurality of vehicles based on the received information; and a controller that controls supply of power to the plurality of vehicles, wherein when the total requested power amount is equal to or less than a first threshold value which corresponds to a maximum power amount of the power source, the controller supplies power to the plurality of vehicles only from the power source and not from the electrical storage, when the total requested power amount is larger than the first threshold value and is equal to or less than a second threshold value which corresponds to a sum of the maximum power amount of the power source and the supplemental power of the electrical storage, the controller supplies power to the plurality of vehicles from the power source and the electrical storage, and when the total requested power amount is larger than the second threshold value, the controller sets a supply amount of power supplied from the power source and the electrical storage to the plurality of vehicles to be equal to or smaller than the second threshold value.

* * * * *